Dec. 10, 1935.  J. L. McCONNELL  2,023,433
TROUGH AND RACEWAY FOR ELECTRIC WIRES AND CABLES
Filed Aug. 28, 1933   3 Sheets-Sheet 1

Inventor
John L. McConnell
By Arthur F. Durand
Atty.

Dec. 10, 1935.  J. L. McCONNELL  2,023,433
TROUGH AND RACEWAY FOR ELECTRIC WIRES AND CABLES
Filed Aug. 28, 1933  3 Sheets-Sheet 2
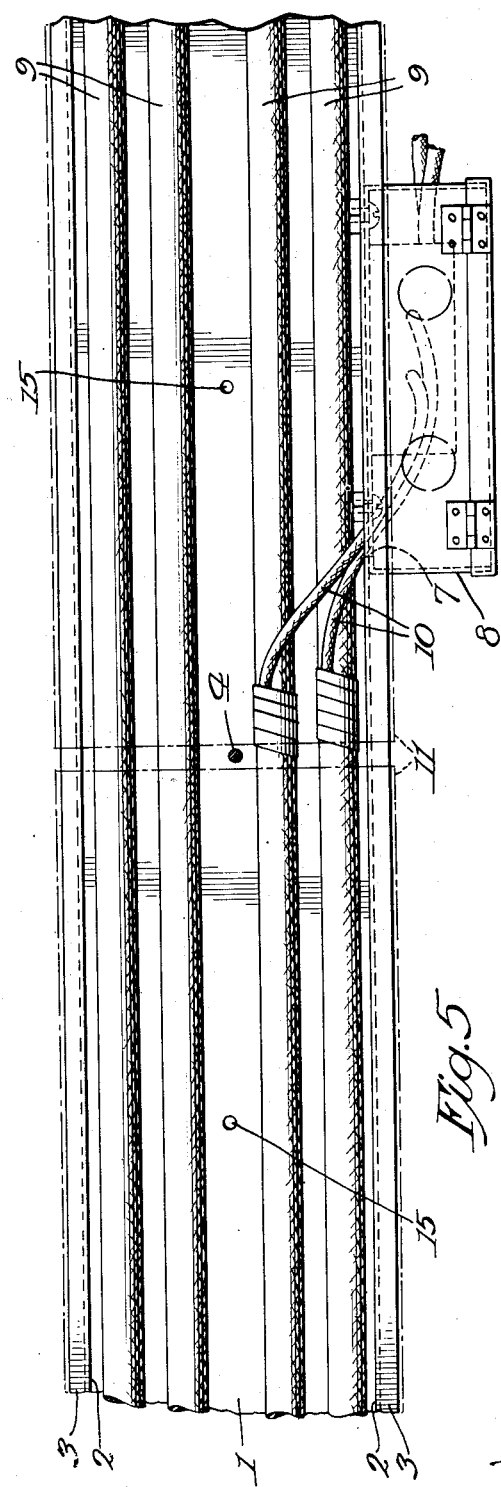
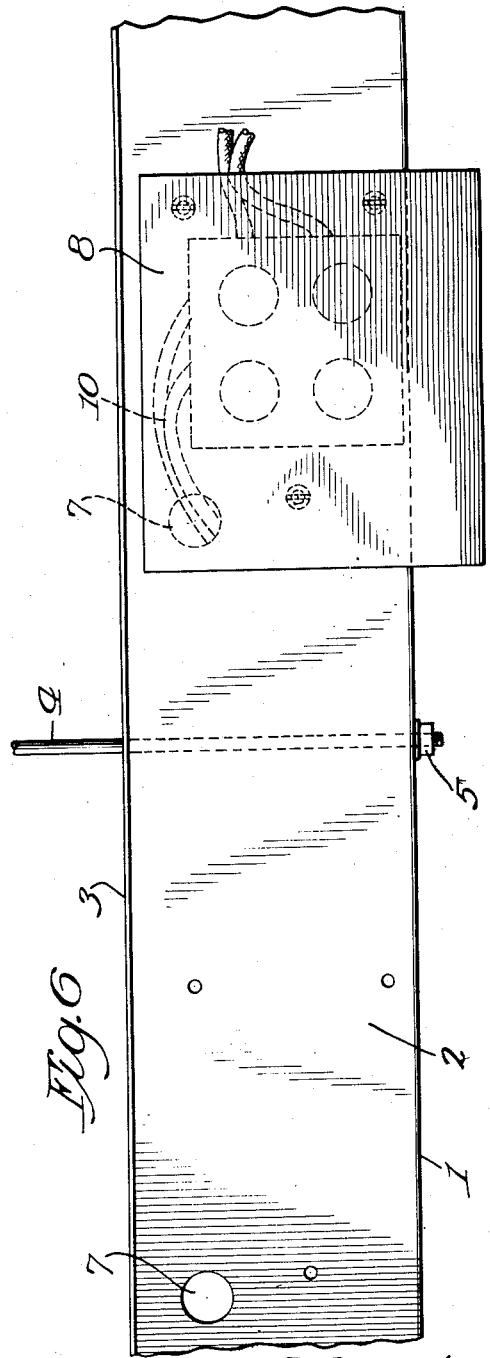
Inventor
John L. McConnell
By Arthur F. Durand
Atty.

Dec. 10, 1935.  J. L. McCONNELL  2,023,433
TROUGH AND RACEWAY FOR ELECTRIC WIRES AND CABLES
Filed Aug. 28, 1933  3 Sheets-Sheet 3
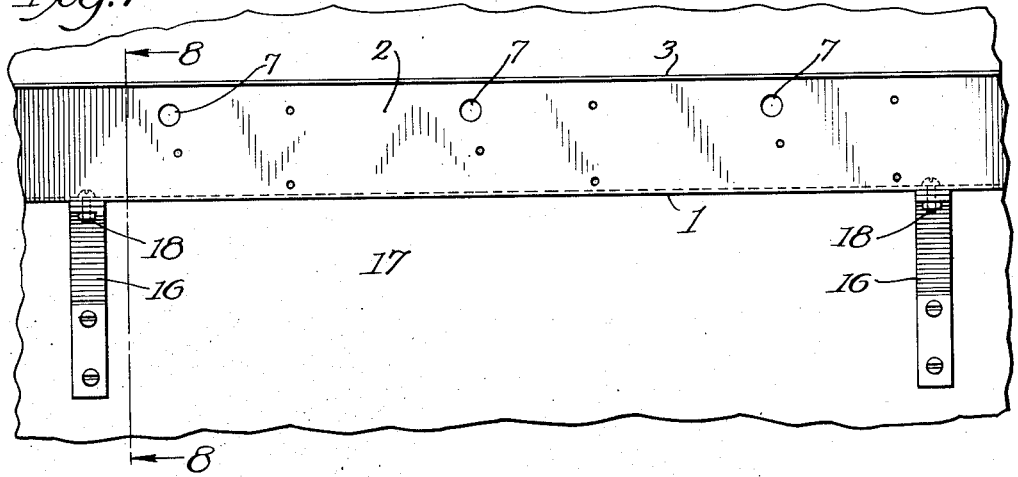
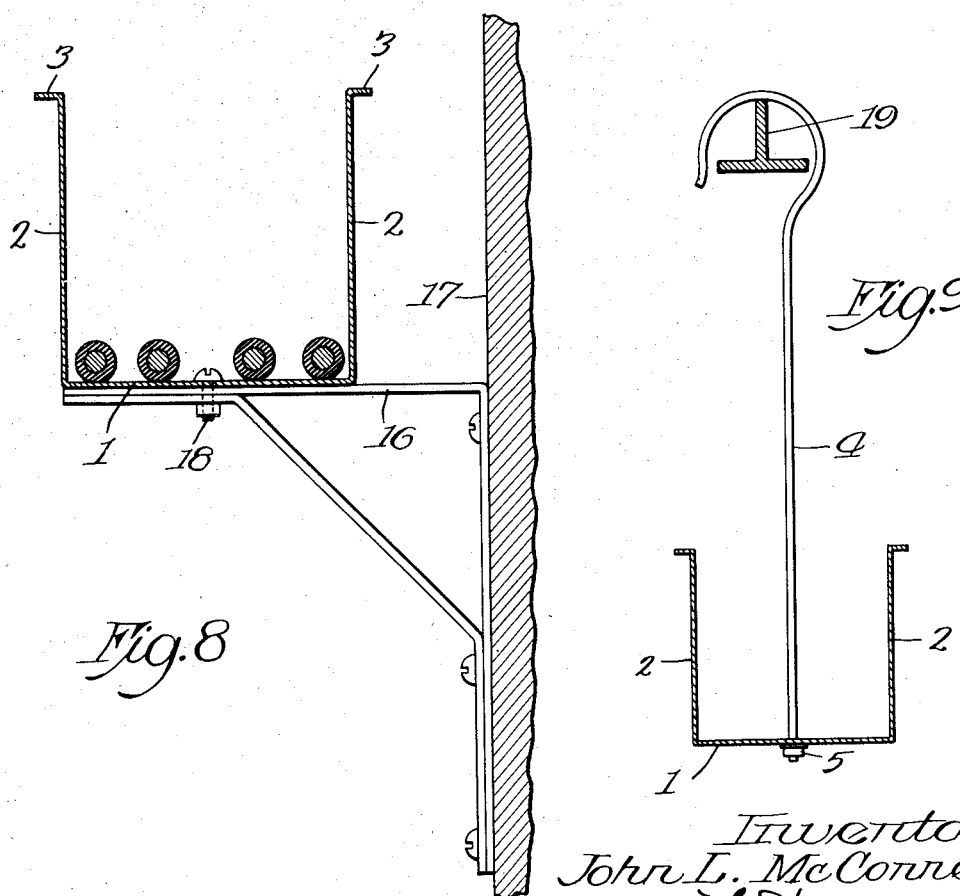
Inventor
John L. McConnell
By Arthur F. Durand
Atty.

Patented Dec. 10, 1935

2,023,433

UNITED STATES PATENT OFFICE 2,023,433

TROUGH AND RACEWAY FOR ELECTRIC WIRES AND CABLES

John L. McConnell, Chicago, Ill.

Application August 28, 1933, Serial No. 687,150

7 Claims. (Cl. 247—3)

This invention relates to sheet metal raceways for electrical cables and wires.

Generally stated, the object of the invention is to provide a novel and improved construction whereby a trough-shaped sheet metal raceway, in which cables or wires may be laid and held, is provided with a top cover that may be easily attached after the wires or cables are laid in the raceway, and which may be easily removed when necessary or desirable.

Another object is to provide a raceway of this kind having a fuse box combined therewith, with provisions for leading the wires or cables out of the raceway and into the fuse box, and out of the other side of the fuse box and back into the raceway, or from fuse box to various places, whereby the raceway and the fuse box are a structural unit.

Another object is to provide a novel and improved construction whereby it will be easy and convenient to make future connections to the feeder cables or wires in the raceway, by simply removing the sections of the cover for the top of the raceway, and by the installation of a fuse box at any required location on the raceway, through which box the taps are made to the feeders.

It is also an object to provide certain details and features of construction tending to increase the general efficiency and the desirability of an electric cable raceway of this particular character.

To the foregoing and other useful ends, the invention consists in matters hereinafter set forth and claimed and shown in the accompanying drawings, in which—

Fig. 5 is a plan view of the construction shown in Fig. 4 of the drawings.

Fig. 6 is a side elevation of the structure shown in Fig. 4 of the drawings.

Fig. 7 is a side elevation of the raceway, showing a different form of the invention.

Fig. 8 is an enlarged transverse section on line 8—8 in Fig. 7 of the drawings.

Fig. 9 is a view similar to Fig. 4, illustrating a different form of support for the raceway.

As thus illustrated, the invention comprises a sheet-metal trough having a bottom 1 and vertical sides 2, the latter preferably having their upper edges formed with outturned flanges 3, as shown. This trough can be made in sections of any suitable or desired length.

Figure 4:
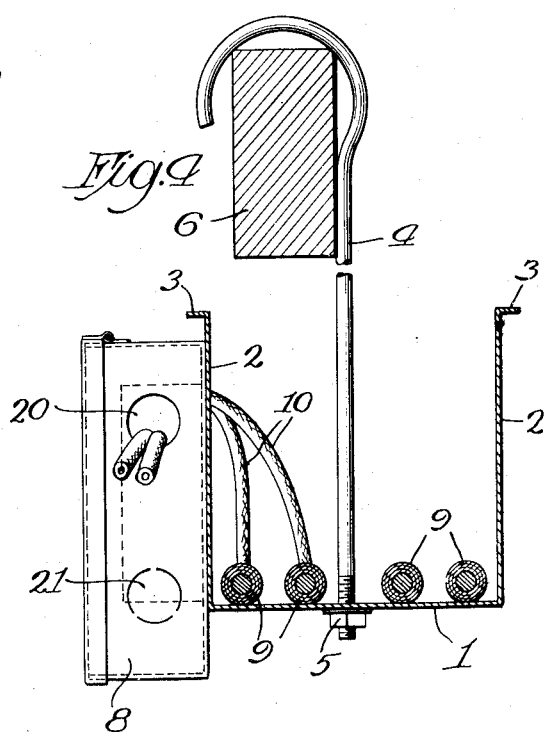
Fig. 4 is a transverse section of the raceway, showing the fuse box in end elevation, and showing the manner in which the cables or wires pass out through the side of the raceway and into the fuse box, and out of the box or back into the raceway.

The trough can be supported in any suitable or desired manner, but preferably by hook rods 4, having their lower ends inserted through the bottom 1 and provided with a nut 5, as shown in Fig. 4 of the drawings. The hooked upper end of the rod may be supported by a structural member 6, or by any suitable support.

At intervals, one of the side walls 2 is provided with openings 7, and wherever necessary a fuse box 8 can be secured in place over one of said holes. The cables 9 are simply lifted sideways into the trough-shaped sheet-metal raceway thus provided, and taps 10 from said cables are passed through the holes 7 into the fuse box. In this way, cables in the raceway may be tapped at intervals and the current taken to electric lights or other translating devices in a convenient manner.

Figure 1:
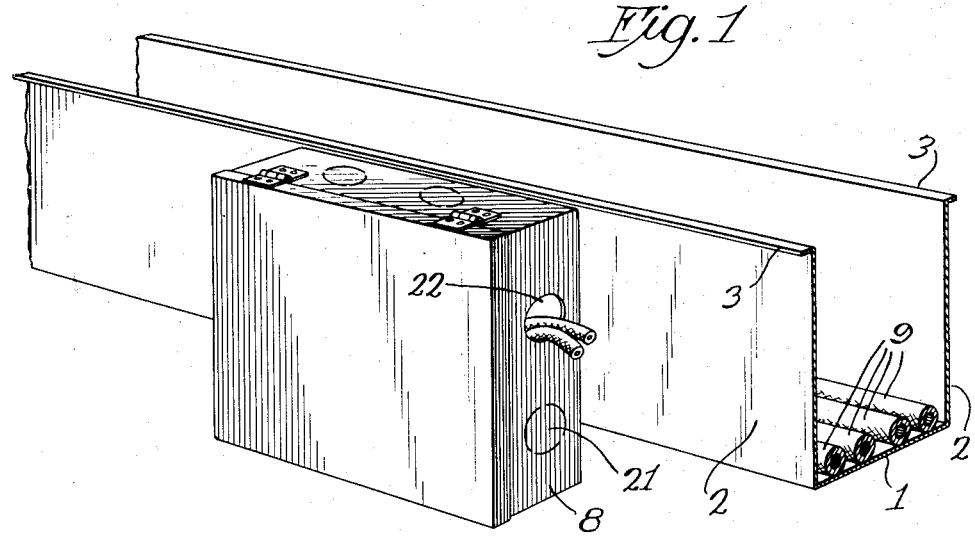
Fig. 1 is a perspective of a raceway and fuse box embodying the principles of the invention, showing the cover removed.
Figure 2:
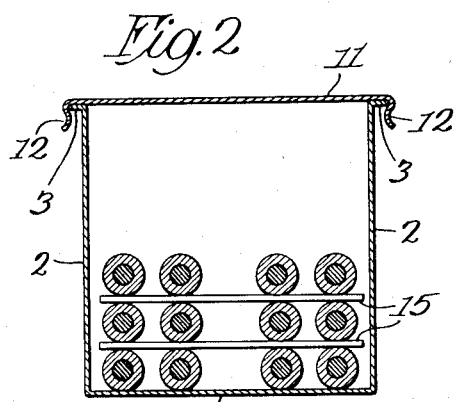
Fig. 2 is a transverse section of said raceway.
Figure 3:
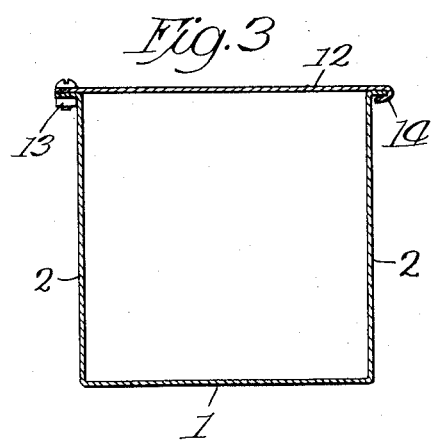
Fig. 3 is a similar transverse section showing a different method of fastening the cover in place.

Preferably, the raceway has its top provided with a cover or closure 11, as shown in Fig. 2, formed with flanges 12 that snap over the flanges 3 previously mentioned; or, as shown in Fig. 3, one edge of the cover 12 can be secured in place by bolts 13, while the other edge may have a tight fit over the flange 3, as shown at 14 in this figure of the drawings. It is obvious that either cover may be easily removed. These covers will be made in sections, of course, with their ends engaging the hook rods 4, so that the latter will be interposed between the meeting ends of the sections of the cover.

As shown in Fig. 2 of the drawings, several layers of cables may be employed, with spacers interposed between. For that purpose, the fuse boxes may be as large and may contain as many fuse plugs as are necessary for the taps from the cables.

It will be seen that a raceway constructed in this manner is calculated to simplify the work of supporting electrical cables, inasmuch as the cables do not have to be pulled in endwise of the raceway, but may simply be raised sidewise over the edge of the raceway, and then dropped down within the latter. This eliminates the troublesome practice of taking hold of the end of a cable and pulling it in endwise through one end of the raceway and out at the other end thereof. In addition, the raceway is conveniently and inexpensively supported, is easily opened for the inspection of the cables or for the removal or addition of cables, and is easily installed or removed.

It will be seen that the bottom of the raceway sections can be provided at intervals with holes 15, for the hanger rods 4, so that these may be put in wherever necessary for the support of the raceway. Also, it will be seen that the hook-like rods 4 can each be adjusted or turned about a vertical axis, thereby to hook over anything that may be in convenient position for this purpose. Thus, a raceway of this kind can be hung below a roof or floor or other structure, and may be hooked in place wherever something can be found to form a support.

As shown in Figs. 7 and 8 of the drawings, the raceway may be supported on brackets 16 suitably secured to a side wall or column 17, bolts 18 with nuts on their lower ends, as shown, being inserted downwardly through the bottom of the raceway and through the brackets. Obviously, there are various ways in which the raceway can be supported, depending upon the circumstances and the character of the work.

In Fig. 4, the hook rods 4, previously described, are shown hooked over a T-iron structural member 19, and it is obvious that these hook rods may be of different sizes or shaped in various ways to engage supports of different kinds.

The distribution from the fuse box, preferably, will be from the box through holes 20 in the fuse box, as shown, and for this purpose the box walls may have knock-outs 21 formed therein, at different places, which can be easily removed to form the holes for the connections or wires.

As it will be seen in Figs. 5 and 6 of the drawings, the fuse boxes plainly will contain fuse plug panels, shown in dotted lines, for connecting the distributing circuits to the cables or other electrical conductors in the raceway. As shown in the drawings, each fuse box may have a hinged front cover therefor, affording access to the fuse plug and circuit connections within these boxes.

Also, and while the fuse boxes are shown and described as being mounted on the side of the raceway, it is obvious that these fuse boxes can be otherwise mounted or supported on the raceway or conduit in which the cables and connections are enclosed, and it is obvious that the fuse boxes can be supported independently of the raceway, but nevertheless closely associated therewith, without departing from the spirit of the invention.

Thus it will be seen that the housing or raceway for the cables and wires may be supported in the clear, one way or another, as shown in Figs. 4, 8, and 9, and that the fuse boxes 8 may be located at intervals along either side of the trough or raceway, leaving the bent top of the latter free to be closed or uncovered by cover strips 11, as indicated, so that leads or taps can be taken out through the fuse boxes for lighting or power circuits.

Thus, as described and shown, in each form of the invention the trough or raceway has flat vertical sides and a flat bottom and has flat cover means, so that the cable contents of the trough or raceway are entirely enclosed, and practically the entire outer surface of the trough or raceway is left exposed. In this way, and with the trough supported in the clear, the fuse boxes 8 are easily fastened to the side of the trough, and are easily and conveniently accessible when thus supported entirely by the trough, but with their tops a distance below the upper edges of the trough, so that the cover means can be easily applied or removed. In each form of the invention, moreover, it will be seen that supporting members are provided and spaced apart for engaging openings formed at intervals in the bottom wall of the trough, and that such supporting means are, in each form of the invention, provided with removable screw or bolt nuts on the under side of the trough. In this way, the trough can be unfastened from the hangers or brackets, if necessary or desirable, for manipulation or adjustment, regardless of whether the cover is in place on the trough. In addition, the construction is such that the fuse boxes can be applied to either side of the trough, very obviously, and the entire novel construction is simple and convenient and at the same time adaptable to various conditions and situations where electrical cables or wires must necessarily or at least desirably be supported in an orderly and accessible manner and with comparatively little expense.

What I claim as my invention is:

1. A raceway for enclosing electrical cables or conductors comprising an elongated sheet metal trough of channel formation and open at the upper side thereof, the base wall of the trough being provided with apertures spaced longitudinally of the trough and intermediate the side walls thereof, and members received in said apertures and extending upwardly through the open side of the trough, said members being formed to provide hooks at the upper ends thereof above the trough, whereby the trough may be suspended from above, the construction and arrangement being such as to provide for the free introduction of cables over the side walls of the trough.

2. A raceway for electrical cables or conductors comprising an elongated sheet metal trough of channel section open at the upper side, the base wall of the trough being provided with apertures spaced longitudinally of the trough and intermediate the side walls thereof, and members received in said apertures and extending upwardly through the open side of the trough, said members being formed to provide hooks at the upper ends thereof above the trough, whereby the trough may be suspended from above, the construction and arrangement being such as to provide for the free introduction of cables over the side walls of the trough, and fuse boxes secured to the side wall of the trough wholly below the upper edge of the wall at intervals along the length of the trough.

3. A structure as specified in claim 2, having a cover plate detachably engaging the upper edges of said trough, in a plane above the plane of the tops of said fuse boxes formed in sections between said members.

4. A structure as specified in claim 2, said trough being supported in the clear so that said fuse boxes can be secured to either side thereof.

5. A raceway for electrical cables or conductors comprising an elongated sheet metal trough of channel section open at the upper side, the base wall of the trough being provided with apertures spaced longitudinally of the trough and intermediate the side walls thereof, and supporting members spaced apart and provided with means engaging said apertures, the construction and arrangement being such as to provide for the free introduction of cables over the side walls of the trough, and fuse boxes secured to the side wall of the trough wholly below the upper edges of the walls at intervals along the length of the trough, the latter being supported in the clear, so that the fuse boxes can be secured to either side thereof, together with removable cover means for the top of said trough in a plane above the tops of said boxes.

6. A structure as specified in claim 5, said members comprising hanger hooks extending upwardly between the sides of the trough to engage an overhead support.

7. A structure as specified in claim 5, said supporting means comprising rigidly supported brackets underneath the trough.

JOHN L. McCONNELL.